(12) United States Patent
Mühle et al.

(10) Patent No.: US 9,290,402 B2
(45) Date of Patent: Mar. 22, 2016

(54) METHOD AND DEVICE FOR PRODUCING TECHNICAL GLASS PARTS FOR OPTICAL APPLICATIONS

(75) Inventors: Peter Mühle, Jena (DE); Wolfram Wintzer, Jena (DE)

(73) Assignee: DOCTER OPTICS SE, Neustadt an der Orla (DE)

( * ) Notice: Subject to any disclaimer, the term of this patent is extended or adjusted under 35 U.S.C. 154(b) by 746 days.

(21) Appl. No.: 13/191,284

(22) Filed: Jul. 26, 2011

(65) Prior Publication Data

US 2011/0289968 A1    Dec. 1, 2011

Related U.S. Application Data

(62) Division of application No. 12/224,261, filed as application No. PCT/DE2007/000251 on Feb. 12, 2007.

(30) Foreign Application Priority Data

Feb. 23, 2006 (DE) .................. 10 2006 008 938
Mar. 30, 2006 (DE) .................. 20 2006 005 261 U (51) Int. Cl.
| | |
|---|---|
| *C03B 11/08* | (2006.01) |
| *C03B 11/12* | (2006.01) |
| *C03B 29/00* | (2006.01) |
| *C03B 19/02* | (2006.01) |

(52) U.S. Cl.
CPC ............... *C03B 11/08* (2013.01); *C03B 11/12* (2013.01); *C03B 19/025* (2013.01); *C03B 2215/71* (2013.01)

(58) Field of Classification Search
USPC ............................................. 65/102
See application file for complete search history.

(56) References Cited

U.S. PATENT DOCUMENTS

| | | | | |
|---|---|---|---|---|
| 4,913,718 A * | 4/1990 | Yoshimura et al. | ............. | 65/104 |
| 6,003,338 A * | 12/1999 | Yamamoto et al. | ............. | 65/102 |
| 6,595,026 B1 * | 7/2003 | Tsukada | ............. | 65/24 |
| 2002/0046577 A1 * | 4/2002 | Maeda et al. | ............. | 65/85 |
| 2005/0172671 A1 * | 8/2005 | Yoneda et al. | ............. | 65/64 |

FOREIGN PATENT DOCUMENTS

EP       1008562 A2 *   6/2000

* cited by examiner

*Primary Examiner* — Angela Ortiz
*Assistant Examiner* — Cynthia Szewczyk
(74) *Attorney, Agent, or Firm* — Kenyon & Kenyon LLP (57) ABSTRACT

Disclosed is a method for producing a technical glass part, particularly meeting high requirements with respect to contour accuracy and surface quality, particularly a precision lens, wherein a blank including a cast-on section is produced using an injection molding process, wherein the blank is cooled down and subsequently heated, and wherein the blank subsequently is blank molded, particularly on both sides, into a technical glass part meeting high requirements with respect to contour accuracy and surface quality, particularly a precision lens.

32 Claims, 9 Drawing Sheets

METHOD AND DEVICE FOR PRODUCING TECHNICAL GLASS PARTS FOR OPTICAL APPLICATIONS

CROSS-REFERENCE TO RELATED APPLICATIONS

This application is a divisional of U.S. patent application Ser. No. 12/224,261, filed on Aug. 22, 2008, which is a National Phase of International Application No. PCT/DE2007/000251, filed on Feb. 12, 2007, which claims priority to German Patent Application No. 10 2006 008 938.3, filed on Feb. 23, 2006, and to German Patent Application No. 20 2006 005 261.5, filed on Mar. 30, 2006, each of which is incorporated herein in its entirety by reference thereto.

FIELD OF THE INVENTION

The present invention relates to a device and a method for producing a technical glass part, particularly meeting high requirements with respect to contour accuracy and/or surface quality. Such a technical glass part may be an optical lens, particularly a precision lens, an optical freeform or a technical glass article meeting high requirements with respect to contour accuracy and surface quality. A technical glass part is meant to be a technical glass part for optical applications.

BACKGROUND

Devices and methods for producing precision lenses are known, for example, from US 2006/0107697 A1, EP 0356 068 B1, EP 1 273 424 A1, DE 198 26 385 A1 as well as Patent Abstracts of Japan to JP 63182223 A, JP 62292636 A, JP 62292630 A, JP 62292629 A, JP 61266320 A, JP 61242921 A, JP 61242920 A, JP 57041155 A, JP 58177257 A, JP 11333686, JP 09277327 A, JP 60033221 A and JP 01298034 A.

DE 103 23 989 B4 discloses a device for implementing a method for producing blank molded glass bodies for optical equipments, wherein a liquid glass gob is supplied to a levitation pre-mould in which the glass gob without contacting the pre-mould is blanked into a blank which after elapse of a predefined time is transferred to a separate press mould and pressed therein using a molding tool into an end form, wherein the transfer of the blank to the press mould is conducted in such a way that the blank is falling in a free fall from the pre-mould into the press mould, wherein the pre-mould for transferring the glass gob is shifted over the press mould, is stopped in this transfer position and is pivoted away downwardly from the glass gob using two turntables, one of which includes circularly disposed pre-moulds for forming said blanks from a liquid glass gob which include in the lower portion thereof minor holes for building in an air cushion and the other includes circularly disposed press moulds for molding the blanks after transfer out of the pre-moulds, and wherein each pre-mould is attached to the first turntable via a switchable holder holding the pre-mould in a first switching position horizontally and in a second switching position holding the pre-mould in a position enabling the free fall of the blanks.

DE 101 40 626 B4 discloses a method for producing a press formed glass body, wherein a molten glass mass is poured into a mould, pressed within the mould using a press ram and cooled down and subsequently removed from the mould as the press formed glass body, wherein the molten glass mass in the mould is subjected several molding processes, wherein between the molding processes a cooling process occurs and at least once between the molding processes a heating process for heating the outer regions of the glass mass is conducted such that the cooling of the glass mass in the outer region is matched to the cooling within the core.

DE 102 34 234 A1 discloses a method of blank molding a glass body for optical applications using a press mould including an upper mould and a lower mould and optionally a ring for receiving the glass body heated to a temperature above its deformation temperature, wherein an electrical voltage is applied between the upper mould and the lower mould and at least after matching the temperature of the glass body to the temperature of the press mould a compression pressure is applied to the glass body.

DE 103 48 947 A1 discloses a press for hot forming optical elements made of glass including a device for heating a mould block including an upper mould, a lower mould and a guiding ring for receiving the glass material, wherein as a heating mechanism an inductive heating is provided and the mould block is disposed on top of a thermally isolating body during the heating process.

DE 196 33 164 C2 discloses a method and a device for blank molding optical components for illuminating purposes at least on one side, wherein at least one mechanically portioned glass part is transferred by a gripper to at least one annular receptacle extendable from at least one oven and moved from the receptacle into the oven and is heated therein on the receptacle, wherein the heated glass part is moved from the receptacle out of the oven and is again transferred to the gripper which supplies the heated glass part to a press for blank molding the glass part at least on one side, and wherein the blank molded glass part is then removed from the press, transferred to a cooling zone and carried away from there.

DE 103 60 259 A1 discloses a method of blank molding optical elements made of glass, wherein a glass gob arranged in a mould block is heated to a temperature T above its transformation temperature $T_G$, the glass gob is pressed and cooled down to a temperature lower than $T_G$, wherein the cooling process initially is conducted in a first temperature interval above $T_G$ using a first cooling rate and then in a second temperature interval including $T_G$ using a second cooling rate, and wherein for adjusting the first and second cooling rate an active cooling is conducted.

DE 44 22 053 C2 discloses a method of producing glass forms, wherein in a pressing station molten glass is pressed in a press mould predetermining the exterior shape of the glass form using a press ram predetermining its interior shape, wherein the press ram remains in contact with the glass form within the press mould and thus dissipates heat from the surface of the glass form only for a time until the glass form has cooled down in a near-surface area to such a temperature that it includes an inherent rigidity sufficient for removing the glass form from the press mould, and wherein the glass form subsequently is removed from the press mould and transferred to a cooling station before it becomes deformed due to partially heating and the glass form is cooled down in the cooling station until it is completely solidified.

Other methods and devices for producing optical components are disclosed for example in JP 09132417 A, JP 10251030 A, EP 1 584 863 A2 and EP 0 078 658 B2.

It is an object of the invention to decrease the costs for producing technical glass parts meeting high requirements with respect to contour accuracy and/or surface quality, particularly precision lenses, compared to known methods.

SUMMARY

The above object is achieved by a method for producing a technical glass part, particularly meeting high requirements with respect to contour accuracy and/or surface quality, particularly a precision lens, wherein a blank is produced using an injection molding process, wherein the blank is cooled and subsequently heated, and wherein the blank subsequently is blank molded, particularly on both sides, into a technical glass part, particularly meeting high requirements with respect to contour accuracy and/or surface quality, particularly a precision lens.

Appropriate glass types are for example B270, F2, DOC-TAN® and borosilicate glass. A precision lens in the sense of the invention particularly is a lens the contour of which deviates from a desired target contour by not more than 2 μm, particularly not more than 1 μm, and/or the surface roughness of which is not more than 5 nm. Particularly, surface roughness in the sense of the invention should be defined according to ISO 4287 as $R_a$. Blank molding in the sense of the invention particularly means molding a glass part or a precision lens such that a post-treatment of an optically effective surface of a glass part or the precision lens, particularly a post-treatment for achieving its desired contour, after the molding process, may be omitted.

Examples for injection molding of glass parts can be found on Internet site www.putsch.com/Pu_Ge_Su/deutscheVersion/Ebene5/FraSets/FSGlas/FS SIM.html. Injection presses for glass parts are available from Putsch GmbH & Co. KG, Frankfurter Straße 5-21, 58095 Hagen, Deutschland.

In a further embodiment of the invention the blank is produced including a cast-on section by using an injection molding process, wherein the volume of the cast-on section may be larger than the volume of the blank. In a further embodiment of the invention the volume of the cast-on section is more than twice the volume of the blank. In a further embodiment of the invention the cast-on section includes a bulge. In a further embodiment of the invention the blank is held suspended during the cooling process and/or during the heating process.

In a further embodiment of the invention the cast-on section includes a supporting foot, and in a further embodiment of the invention it is considered that the blank is mounted upright by provision of the supporting foot during the cooling and/or heating process.

In a further embodiment of the invention the cast-on section is constructed at least in two pieces. A cast-on section in this sense is constructed at least in two pieces if it includes at least two parts which are not connected directly but via the blank.

In a further embodiment of the invention the cast-on section includes at least a cylindrically formed part. In a further embodiment of the invention a spherical diameter associated to the blank, a spherical diameter of the blank and/or the diameter of the blank is at least twice the diameter of the cylindrically formed part. In a further embodiment of the invention the length of the cylindrically formed part is at least twice the diameter of the cylindrically formed part.

In a further embodiment of the invention the blank is cooled down with supply of heat. In a further embodiment of the invention the blank is cooled down at a temperature between 300° C. and 500° C., particularly between 350° C. and 450° C. In a further embodiment of the invention the blank is cooled down at a temperature between 20K and 200K, particularly between 70K and 150K, beneath the transformation temperature $T_G$ of the glass of the blank.

In a further embodiment of the invention the blank is cooled down and subsequently heated such that its temperature gradient is inverted or reversed. In a further embodiment of the invention the blank is heated such that its surface temperature (particularly immediately before the molding process) is in the range between 700° C. and 900° C., particularly between 750° C. and 850° C. In a further embodiment of the invention the blank is heated such that its surface (particularly immediately before the molding process) assumes a temperature corresponding to a temperature at which the glass of the blank has a logarithmic viscosity or viscosity-log value between 5 (corresponding to $10^5$ Pas) and 8 (corresponding to $10^8$ Pas), particularly a viscosity-log value between 5.5 (corresponding to $10^{5.5}$ Pas) and 7 (corresponding to $10^7$ Pas). The temperature gradient may be adjusted such that the temperature within the core of the blank is lower than or close to the transformation temperature $T_G$ of the glass. The transformation temperature $T_G$ of the glass is the temperature at which the glass becomes hardened. The transformation temperature $T_G$ of the glass in the sense of the invention should mean a temperature of the glass at which the glass has a viscosity-log value in a range around 13.2 (corresponding to $10^{13.2}$ Pas), particularly between 13 (corresponding to $10^{13}$ Pas) and 14.5 (corresponding to $10^{14.5}$ Pas)

In a further embodiment of the invention the blank is not touched during the cooling and/or heating process. In a further embodiment of the invention the blank is not touched at a surface provided as an optically effective surface during the cooling and/or heating process. In a further embodiment of the invention the blank is not touched at a surface provided as an optically effective surface except during the molding process. In a further embodiment of the invention the blank is not touched at a surface provided as an optically effective surface before conducting the molding process. In a further embodiment of the invention the blank is not touched at a surface provided as an optically effective surface between the injection molding process and the molding process.

In a further embodiment of the invention the blank via a horizontal press is blank molded into the technical glass part, particularly meeting high requirements with respect to contour accuracy and/or surface quality, particularly a precision lens. In a further embodiment of the invention the cast-on section is removed after molding the technical glass part, particularly meeting high requirements with respect to contour accuracy and/or surface quality, particularly a precision lens.

In a further embodiment of the invention the technical glass part, particularly meeting high requirements with respect to contour accuracy and/or surface quality, particularly a precision lens, is cooled down after the molding process with supply of heat, wherein it may be considered that the cast-on section is removed after cooling down the technical glass part, particularly meeting high requirements with respect to contour accuracy and/or surface quality, particularly a precision lens. Herein according to a further embodiment of the invention the technical glass part, particularly meeting high requirements with respect to contour accuracy and/or surface quality, particularly a precision lens, is mounted suspended or supported upright by provision of a supporting foot during the cooling process.

In a further embodiment of the invention the volume of the blank amounts to between 110% and 130% of the volume of the technical glass part, particularly meeting high requirements with respect to contour accuracy and/or surface quality, particularly a precision lens.

The above object is also achieved by a method of producing a technical glass part, particularly meeting high requirements with respect to contour accuracy and/or surface quality, particularly a precision lens, wherein a blank is produced, and wherein the blank is cooled down and subsequently heated such that its temperature gradient is inverted, and wherein the blank subsequently is blank molded, particularly on both sides, into a technical glass part, particularly meeting high requirements with respect to contour accuracy and/or surface quality, particularly a precision lens.

Appropriate glass types are for example B270, F2, DOCTAN® and borosilicate glass. In a further embodiment of the invention the blank is cooled down with supply of heat. In a further embodiment of the invention the blank is cooled down at a temperature between 300° C. and 500° C., particularly between 350° C. and 450° C. In a further embodiment of the invention the blank is cooled down at a temperature between 20K and 200K, particularly between 70K and 150K, beneath the transformation temperature $T_G$ of the glass of the blank. In a further embodiment of the invention the blank is heated such that its surface temperature is in the range between 700° C. and 900° C., particularly between 750° C. and 850° C. In a further embodiment of the invention the blank is heated such that its surface assumes a temperature corresponding to a temperature at which the glass of the blank has a viscosity-log value between 5 (corresponding to $10^5$ Pas) and 8 (corresponding to $10^8$ Pas), particularly a viscosity-log value between 5.5 (corresponding to $10^{5.5}$ Pas) and 7 (corresponding to $10^7$ Pas).

In a further embodiment of the invention the blank is not touched during the cooling and/or heating process. In a further embodiment of the invention the blank is not touched at a surface provided as an optically effective surface during the cooling and/or heating process. In a further embodiment of the invention the blank is not touched at a surface provided as an optically effective surface except during the molding process. In a further embodiment of the invention the blank is not touched at a surface provided as an optically effective surface before conducting the molding process. In a further embodiment of the invention the blank is not touched at a surface provided as an optically effective surface between the injection molding process and the molding process.

In a further embodiment of the invention the blank by provision of a horizontal press is blank molded into the technical glass part, particularly meeting high requirements with respect to contour accuracy and/or surface quality, particularly a precision lens.

The above object is also achieved by a device for producing a technical glass part, particularly meeting high requirements with respect to contour accuracy and/or surface quality, particularly a precision lens, particularly for carrying out a method including one or more of the above mentioned features, wherein the device includes a melting aggregate, an injection press for molding a blank, a tempering device for cooling down and subsequently heating said blank and a press for molding from said blank a technical glass part, particularly meeting high requirements with respect to contour accuracy and/or surface quality, particularly a precision lens.

In an embodiment of the invention the injection press includes a press mould for molding the blank with a cast-on section. In a further embodiment of the invention the press is constructed as a horizontal press.

Cooling down with supply of heat in the sense of the invention particularly should mean that the cooling process is conducted at a temperature above 100° C.

It is particularly considered that the blank before inverting the temperature gradient is removed from the injection press or a corresponding injection press mould or a mould. It is particularly considered that inverting the temperature gradient takes place outside an injection press mould or a mould.

Figure 9:
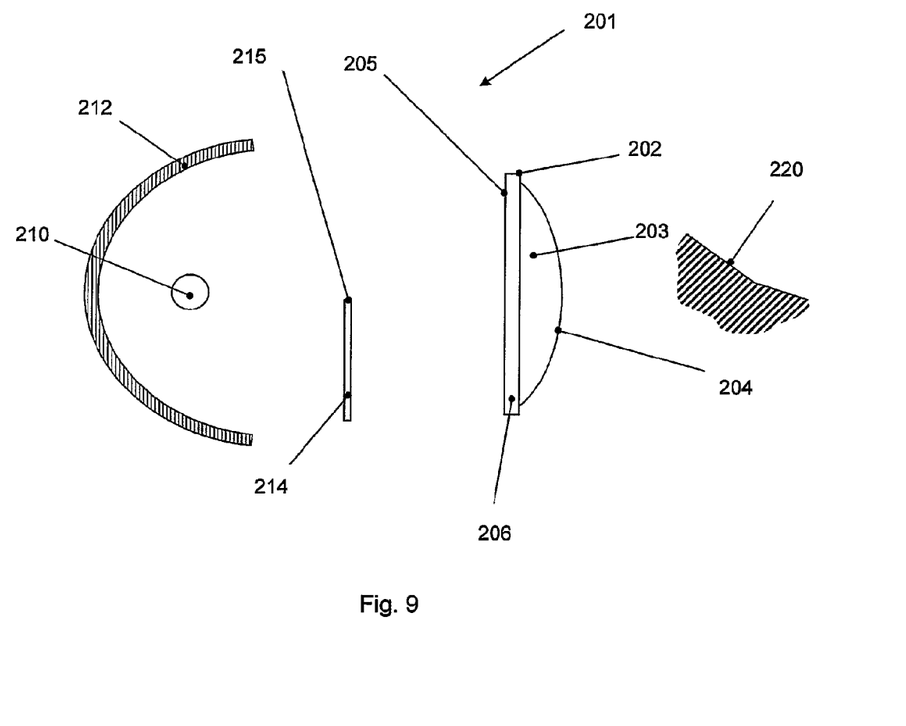
FIG. 9 shows a general arrangement diagram of a typical motor vehicle headlight.

Example embodiments of the invention also relate to a device and a method for producing a headlight lens for a motor vehicle headlight. FIG. 9 shows a general arrangement drawing of a typical motor vehicle headlight 201 including a light source 210 for generating light, a reflector 212 for reflecting light producible via the light source 210 and an aperture 214. The motor vehicle headlight 201 also includes a headlight lens 202 for changing the radiation direction of light producible by the light source 210 and for imaging an edge 215 of the aperture 214 as a brightness-darkness boundary 220. The headlight lens 202 includes a lens body 203, particularly made of glass, including an essentially planar surface 205 facing to the light source 210 and an essentially convex surface 204 facing away from the light source 210. The headlight lens 202 also includes an (optional) edge 206 via which the headlight lens 202 can be fixed within the vehicle headlight 201.

Methods of producing headlight lenses for motor vehicles are disclosed, for example, in DE 103 23 989 B4, DE 196 33 164 C2, DE 10 2004 018 424 A1, DE 102 16 706 B4 and DE 10 2004 048 500 A1.

It is an object of the invention to decrease the costs for producing headlight lenses for motor vehicle headlights. It is a further object of the invention to produce a particularly high quality headlight lens for a motor vehicle headlight within a restricted cost frame.

The above object is achieved by a method for blank molding or producing a motor vehicle headlight or a lens for a motor vehicle headlight, wherein a blank made of glass is produced, the temperature gradient of the blank is inverted, and wherein subsequently the headlight lens for a motor vehicle or the lens for a motor vehicle headlight is pressed from the blank.

Appropriate glass types may be, for example, B270, F2, DOCTAN®.

In a further embodiment of the invention the blank is produced from molten glass, which is molded and/or shaped. In a further embodiment of the invention the mass of the blank is in the range of 50 g to 250 g.

In a further embodiment of the invention the temperature gradient of the blank is adjusted such that the temperature of the core of the blank is markedly above room temperature. In a further embodiment of the invention the temperature gradient of the blank is adjusted such that the temperature of the core of the blank is at least 100° C. above room temperature.

In a further embodiment of the invention the blank for inverting its temperature gradient is initially cooled down, particularly with supply of heat, and subsequently heated, wherein it is considered that the blank is heated such that the temperature of the surface of the blank after the heating process is at least 100° C., particularly 150° C. higher than the transformation temperature $T_G$ of the glass. The transformation temperature $T_G$ of the glass means the temperature at which the glass becomes hardened. Particularly the transformation temperature $T_G$ of the glass in the sense of the invention should mean the temperature at which the glass has a viscosity-log value in a range around 13.2 (corresponding to $10^{13.2}$ Pas), particularly between 13 (corresponding to $10^{13}$ Pas) and 14.5 (corresponding to $10^{14.5}$ Pas). With respect to glass type B270 the transition temperature $T_G$ is about 530° C.

In a further embodiment of the invention the blank is cooled down at a temperature between 300° C. and 500° C., particularly between 350° C. and 450° C. In a further embodiment of the invention the blank is cooled down at a temperature between 20K and 200K, particularly between 70K and 150K, beneath the transformation temperature $T_G$ of the glass of the blank. In a further embodiment of the invention the blank is heated at a temperature between 1000° C. and 1250° C.

In a further embodiment of the invention the temperature gradient of the blank is adjusted such that the temperature of the core of the blank is at least 50K beneath the surface temperature of the blank. In a further embodiment of the invention the blank is cooled such that the temperature of the blank before the heating process is from $T_G-80K$ to $T_G+30K$. In a further embodiment of the invention the temperature gradient of the blank is adjusted such that the core temperature of the blank is 450° C. to 550° C. The temperature gradient is preferably adjusted such that the temperature within the core of the blank is lower than $T_G$ or close to $T_G$. In a further embodiment of the invention the temperature gradient of the blank is adjusted such that the surface temperature of the blank is in the range from 700° C. to 900° C., particularly 750° C. to 850° C. In a further embodiment of the invention the blank is heated such that its surface (particularly immediately before the molding process) assumes a temperature corresponding to the temperature at which the glass of the blank has a viscosity-log value between 5 (corresponding to $10^5$ Pas) and 8 (corresponding to $10^8$ Pas), particularly a viscosity-log value between 5.5 (corresponding to $10^{5.5}$ Pas) and 7 (corresponding to $10^7$ Pas).

In a further embodiment of the invention the blank for inverting its temperature gradient is moved (particularly substantially continuously) lying on a cooled lance through a tempering device (for cooling an/or heating the blank). An appropriate cooled lance is disclosed in DE 101 00 515 A1. In a further preferred embodiment of the invention a coolant flows through the lance according to a reverse flow principle. In a further preferred embodiment of the invention the coolant is additionally or actively heated.

The above object may also be achieved by a device for blank molding a headlight lens for a motor vehicle or a lens for a motor vehicle headlight, particularly for carrying out a method including one or more of the above mentioned features, wherein the device includes a melting aggregate, a blank device for producing a blank disposed downstream of the melting aggregate, a tempering device disposed downstream of the blank device via which the temperature gradient of the blank can be inverted, and a press for molding the blank into the headlight lens for a motor vehicle or the lens for a motor vehicle headlight disposed downstream of the tempering device.

In a further embodiment of the invention the melting aggregate is designed as a tub or pan for melting glass. In a further embodiment of the invention the device includes a cooling zone for cooling the headlight lens for a motor vehicle or the lens for a motor vehicle headlight disposed downstream of the press. In a further embodiment of the invention the temperature gradient of the blank is adjustable via the tempering device such that the core temperature of the blank is markedly above room temperature. In a further embodiment of the invention the temperature gradient of the blank is adjustable via the tempering device such that the core temperature of the blank is at least 100° C. above room temperature.

In a further embodiment of the invention the tempering device is provided with at least one cooled lance for (particularly substantially continuously) conveying the blank through the tempering device or for holding the blank within the tempering device. An appropriate cooled lance is disclosed in DE 101 00 515 A1. In a further embodiment of the invention a coolant flows through the lance according to a reverse flow principle. In a further embodiment of the invention the coolant is additionally or actively heated.

It is particularly considered that the blank is removed from a mould for forming or producing the blank before inverting the temperature gradient. It is particularly considered that inverting the temperature gradient occurs outside a mould.

Cooling with supply of heat in the sense of the invention should mean cooling at a temperature of more than 100° C.

A motor vehicle in the sense of the invention particularly means a surface vehicle usable individually in road traffic. Motor vehicles in the sense of the invention particularly are not limited to surface vehicles having combustion engines.

DETAILED DESCRIPTION

Figure 1:
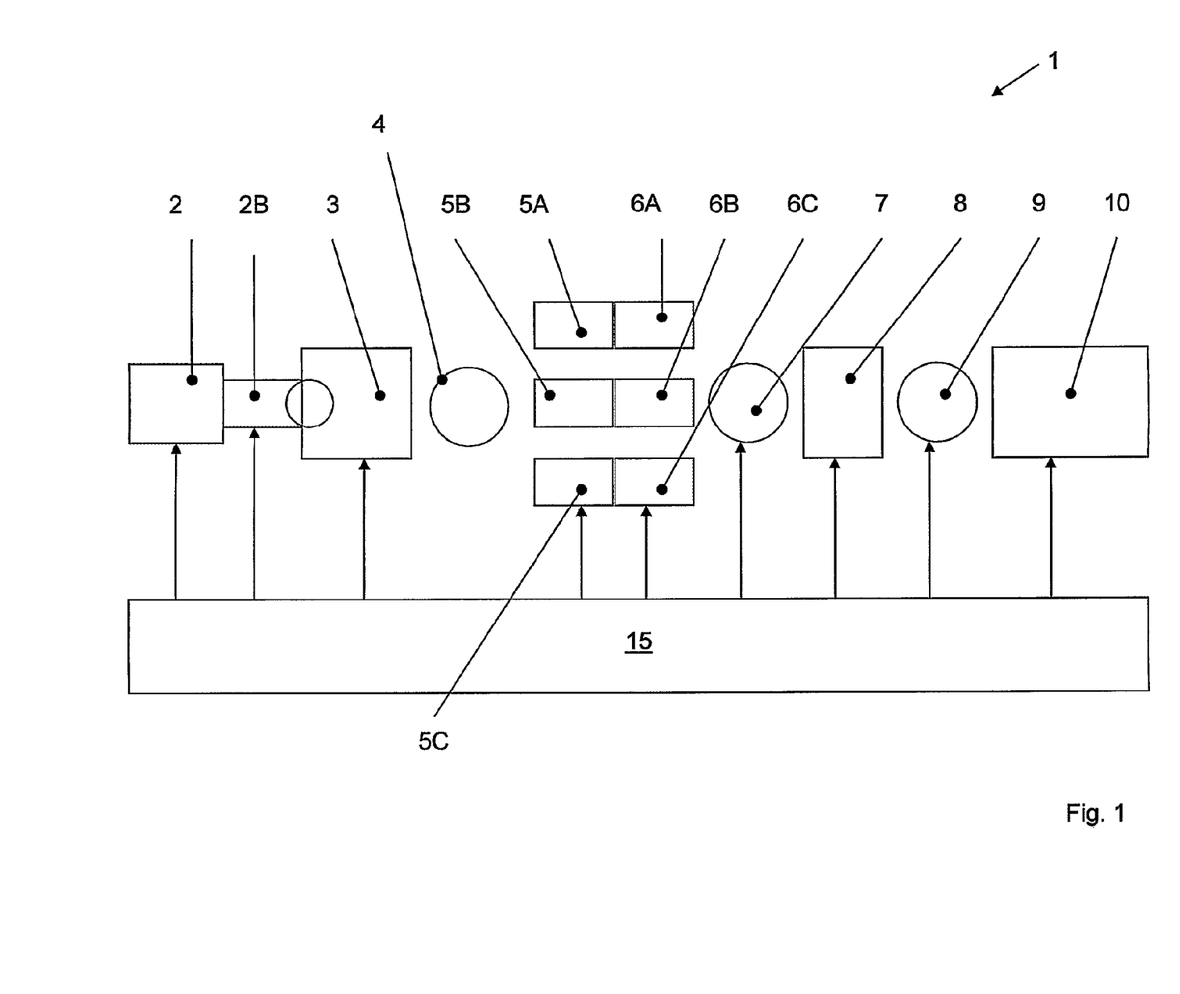
FIG. 1 shows a general arrangement diagram of a device for producing technical glass parts meeting high requirements with respect to contour accuracy and surface quality, particularly precision lenses.
Figure 2:
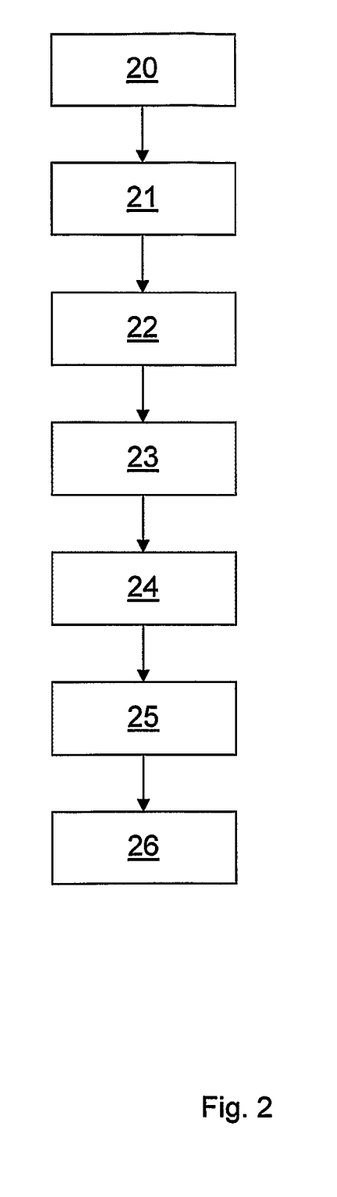
FIG. 2 shows an exemplary flow diagram of a method for producing technical glass parts meeting high requirements with respect to contour accuracy and surface quality, particularly precision lenses.

FIG. 1 shows—in a general arrangement diagram—a device 1 for carrying out a method for producing technical glass parts meeting high requirements with respect to contour accuracy and surface quality, particularly precision lenses, shown in FIG. 2. The device 1 for producing technical glass parts meeting high requirements with respect to contour accuracy and surface quality includes a melting aggregate 2 including an (adjustable) outlet 2B, an injection press 3, a transfer station disposed downstream of the injection press 3 designed as a robot 4 and tempering devices 5A, 5B, 5C for cooling blanks and injection molded parts, respectively and tempering devices 6A, 6B, 6C for heating blanks and injection molded parts, respectively. A combination of tempering device 5A and tempering device 6A, a combination of tempering device 5B and tempering device 6B and a combination of tempering device 5C and tempering device 6C, respectively, is a particular example for a tempering device in the sense of the claims.

The device 1 for producing technical glass parts meeting high requirements with respect to contour accuracy and surface quality also includes a transfer station designed as a robot 7 disposed downstream of the tempering device 6A, 6B, 6C, a press 8, particularly designed as a precision press and horizontal press, a transfer station designed as a robot 9 disposed downstream of press 8 and a cooling zone 10. The device 1 for producing technical glass parts meeting high requirements with respect to contour accuracy and surface quality further includes a control assembly 15 for its control and adjustment.

Control assembly 15 provides for a continuous link of the processing steps shown in FIG. 2.

According to the method shown in FIG. 2, glass, in the present application example B270, is melted in melting aggregate 2 in processing step 20 and discharged metered in processing step 21 following processing step 20 through outlet 2B which may include a plunger. A precise shearing device provides for an accurate cut. The glass gob manufactured in this way is transferred to the injection press disposed beneath the outlet. The melting aggregate 2 can be operated continuously and discontinuously. It is resistant against the glass melts, which are intended for application. As raw materials mixtures, glass residue, refined raw melt or mixtures of these materials come into consideration.

Processing step 21 is followed by a processing step 22 including an injection molding process via which an injection molded part including a blank (injection molding) and an on-cast section is produced for a subsequent blank molding process. The liquid glass gob thus is placed in an injection press mould and pressed in the mould with high velocity, particularly by applying vacuum. A very variable mould geometry and large aspect ratios can be realized. Herein it is important to ensure a high surface quality of the injection press mould to produce a high qualitative surface of the blank. Alternatively the glass may also be pressed out of openings of the mould and remain as free surface. The blank has—apart from the cast-on section—a shape approximately corresponding to the eventual shape of the glass part meeting high requirements with respect to contour accuracy and surface quality, to be pressed, particularly the precision lens to be pressed.

Figure 3:
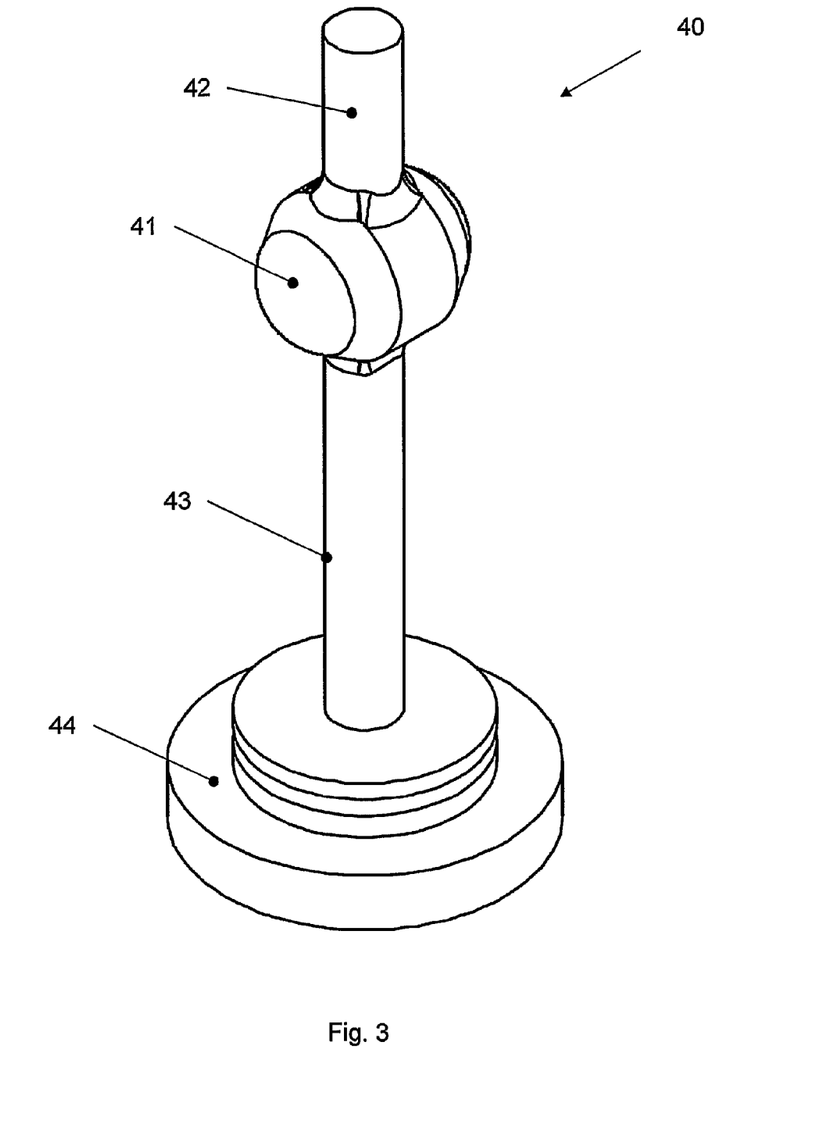
FIG. 3 shows a perspective view of an example of a blank having a cast-on section.
Figure 4:
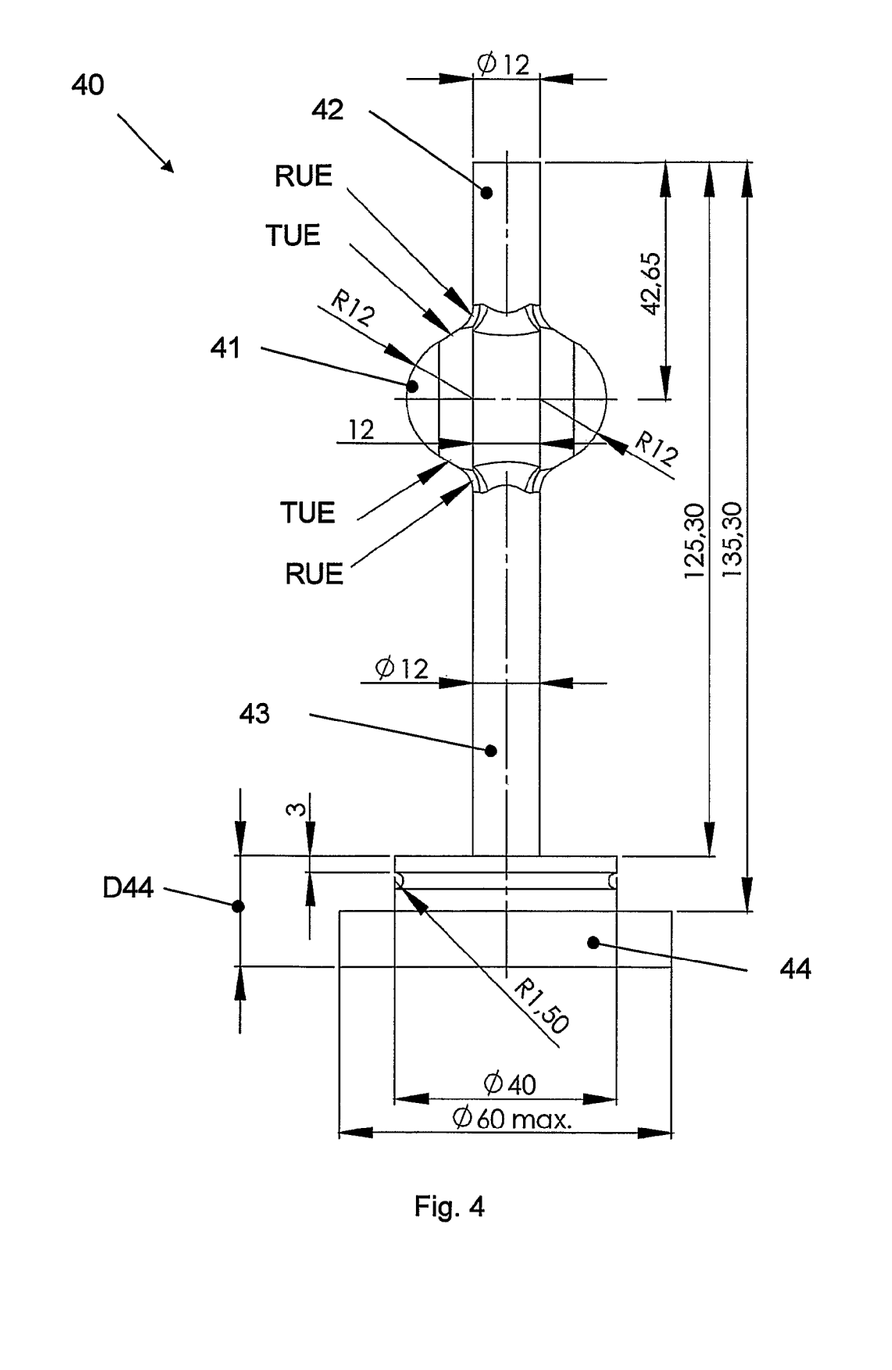
FIG. 4 shows a side view of a blank having a cast-on section according to FIG. 3.

FIG. 3 shows a perspective view of an application example of an injection molded part 40 and FIG. 4 shows a side view of the injection molded part 40. The injection molded part 40 includes a blank 41 intended for a subsequent blank molding process, a cylindrical part 42, a cylindrical part 43 and a supporting foot 44. The cylindrical parts 42 and 43 together with the supporting foot 44 form a cast-on section. Reference symbol RUE in FIG. 4 refers to a rounded transition. Reference symbol TUE refers to a tangential transition. The thickness D44 of supporting foot 44 referred to by reference symbol D44 is variable and depends on the amount of glass. The dimensioning in FIG. 4 refers to the unit millimeter. The volume of the blank is preferably between 110% and 130% of the volume of the eventually obtained technical glass part meeting high requirements with respect to contour accuracy and surface quality, particularly the precision lens.

Processing step 22 is followed by a processing step 23 in which the blank is cooled using one of the tempering devices 5A, 5B, 5C. For transfer the transfer station designed as a robot 4 is provided. The blank may be suspended at its cast-on section or placed in the tempering devices 5A, 5B and 5C, respectively. The blank is cooled using the tempering devices 5A, 5B, 5C preferably at a temperature between 300° C. and 500° C., particularly between 350° C. and 450° C. In the present application example the injection molded part and thus blank 5 is cooled for 5 minutes at a temperature of 400° C. For increasing the variability at this time blanks can be cycled out and cooled down to room temperature separately.

In a subsequent processing step 24 the blank is heated to a temperature necessary for molding via one of the tempering devices 6A, 6B, 6C. Herein it is preferably considered that the blank is suspended at its cast-on section or placed in the tempering devices 6A, 6B and 6C, respectively. The blank preferably is heated such that the temperature at its surface (particularly immediately before the molding process) is between 700° C. and 900° C., particularly between 750° C. and 850° C.

The tempering devices 5A, 5B, 5C and 6A, 6B, 6C for example may be replaced by a tunnel furnace, particularly including chambers. In this case particularly the processing steps 23 and 24 may be combined.

Processing steps 23 and 24 are coordinated such that an inversion of the temperature gradient is obtained. While the blank before processing step 23 (under the assumption of a continuous temperature curve) is inside warmer than outside after processing step 24 (under the assumption of a continuous temperature curve) it is outside warmer than inside. The temperature gradient is preferably adjusted such that the temperature within the core of the blank is beneath or close to $T_G$. Herein the control parameters are the temperature in the tempering devices 5A, 5B, 5C and 6A, 6B, 6C and the dwell time of the blank inside the tempering devices 5A, 5B, 5C and 6A, 6B, 6C. It is preferable to rotate the blank—held at its on-cast section—during processing steps 23 and 24.

If blanks are cycled out they are cooled down to room temperature separately and subsequently cycled in again and heated discontinuously.

Processing step 24 is followed by processing step 25 in which the blank is placed in press 8 at the cast-on section via the robot 7 and pressed, particularly on both sides, into a technical glass part meeting high requirements with respect to contour accuracy and surface quality, particularly the precision lens. In a preferred embodiment the press 8 is oriented horizontally (horizontal press). Subsequently the technical glass part meeting high requirements with respect to contour accuracy and surface quality, particularly the precision lens, is removed via robot 9 in a processing step 26 and supplied to the cooling zone 10. Herein the cooling process is carried out in a conventional manner, wherein the cast-on section is embedded into the bearing and holding concept and removed subsequently to the cooling process.

Depending on the requirements to the products the processing steps are carried out under air-conditioned cleanroom conditions. The blank—apart from the molding process—is only touched at the cast-on section so that the (eventual) optically effective surfaces are not touched.

In one embodiment between processing step 22 and processing step 25 an additional processing step may be provided in which a fire polishing process for improving the surface quality is carried out. In this case the device 1 for producing technical glass parts meeting high requirements with respect to contour accuracy and surface quality includes corresponding mechanisms for implementing the fire polishing process.

Figure 5:
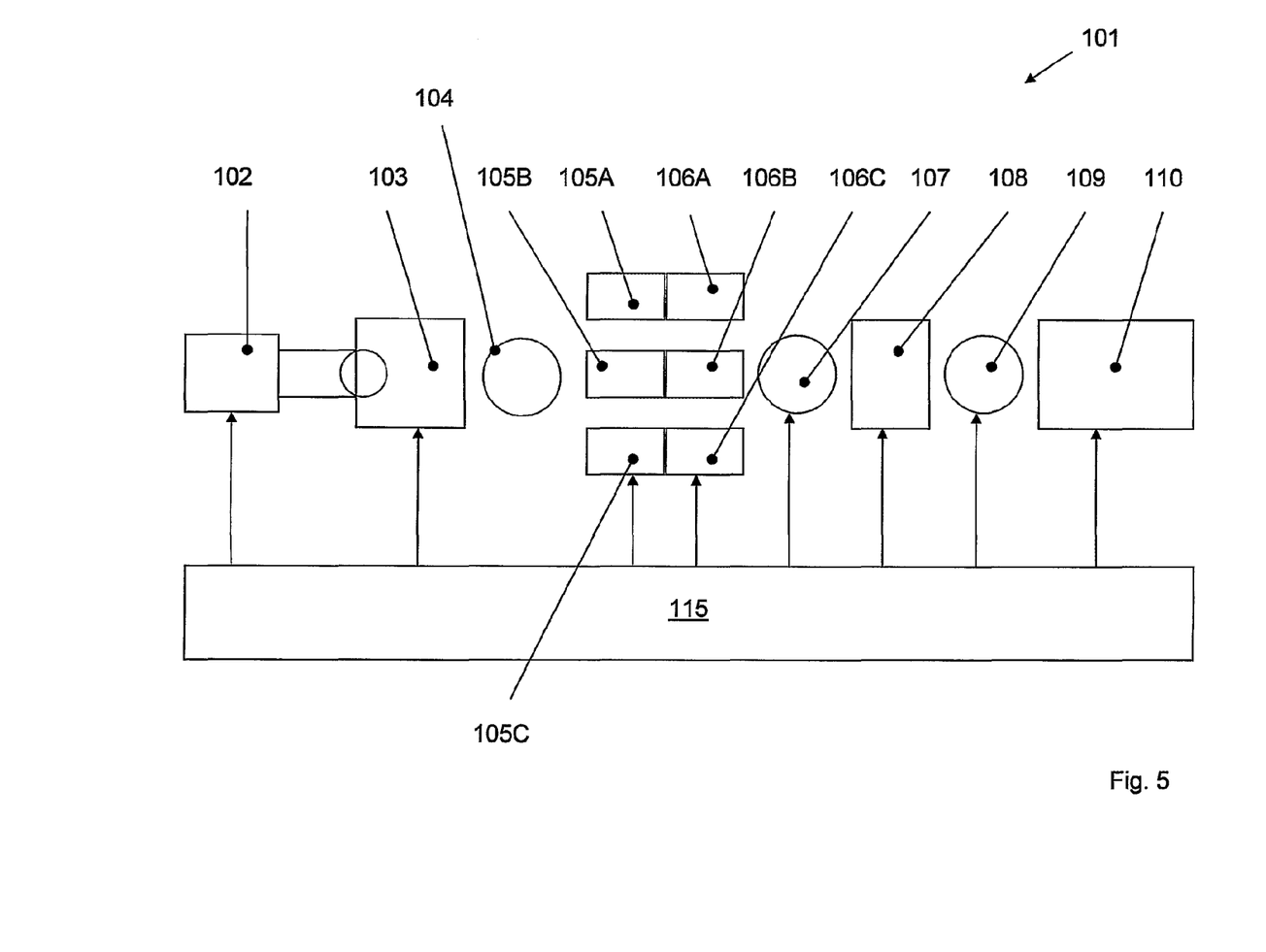
FIG. 5 shows a general arrangement diagram of a device for producing a headlight lens for a motor vehicle or a lens for a motor vehicle headlight.
Figure 6:
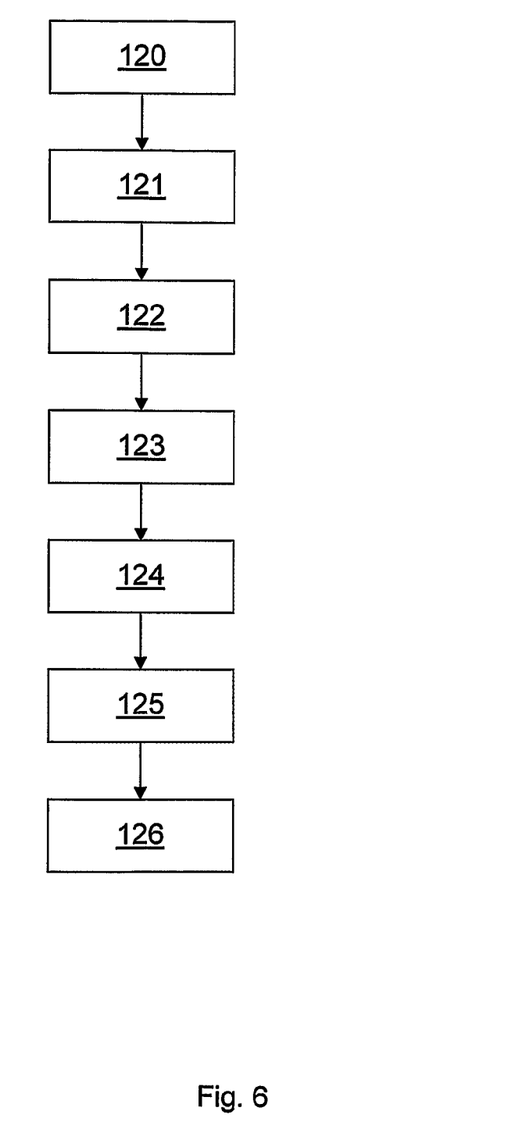
FIG. 6 shows an exemplary flow diagram of a method for producing a headlight lens for a motor vehicle or a lens for a motor vehicle headlight.
Figure 10:
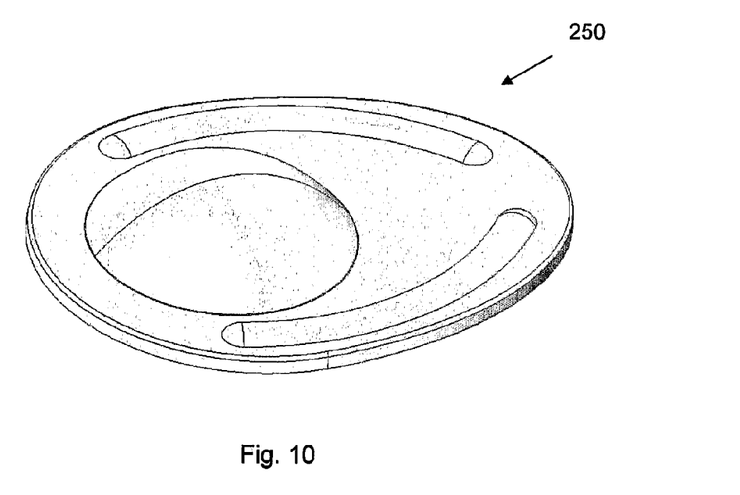
FIG. 10 shows an example of a lens for a motor vehicle headlight.
Figure 11:
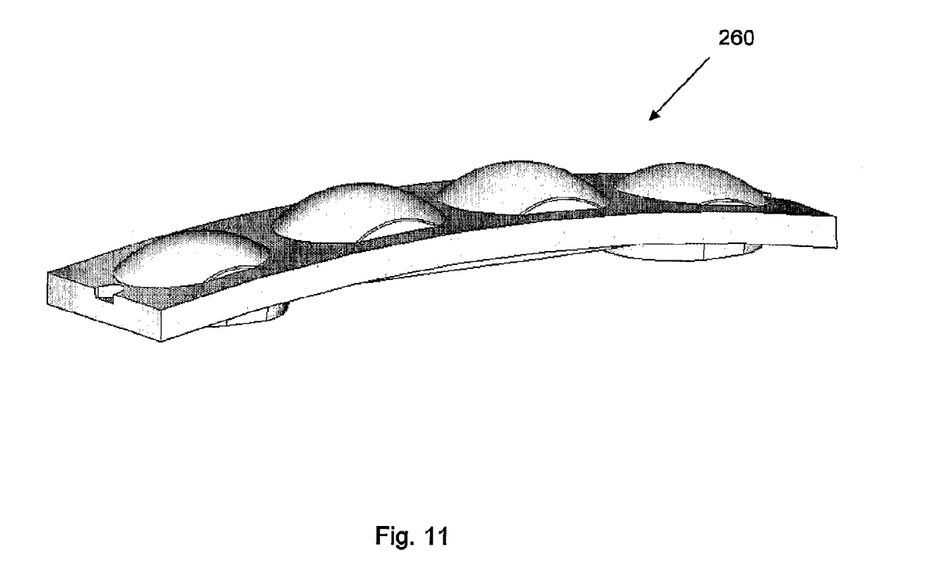
FIG. 11 shows another example of a lens for a motor vehicle headlight.

FIG. 5 shows—in a general arrangement diagram—the device 101 for implementing a method for producing headlight lenses for a motor vehicle shown in FIG. 6 such as headlight lens 202 for a motor vehicle shown in FIG. 9 or lenses for motor vehicle headlights such as lenses 250 and 260 for motor vehicle headlights shown in FIG. 10 and FIG. 11. Device 101 includes a melting aggregate 102, such as a tub or pan, in which in a processing step 120 glass is molted, in the present application example B270 or DOCTAN®. Melting aggregate 102 may include, for example, an adjustable outlet. Upstream from melting aggregate 102 liquid gas is supplied in processing step 121 into a blank device 103 for producing a blank, particularly having a mass of 50 g to 250 g, such as a gob or a blank close to final contours (a blank close to final contours has a contour which is similar to the contour of the headlight lens for a motor vehicle or a lens for a motor vehicle headlight to be pressed, i.e., molded). This may include, for example, moulds into which a pre-defined amount of glass is poured. Using the blank device 103, the blank is produced in a processing step 122.

Processing step 122 is followed by a processing step 123 in which the blank is transferred using a transfer station 104 to one of the cooling devices 105A, 105B or 105C and is cooled using the cooling device 105A, 105B or 105C at a temperature between 300° C. and 500° C., particularly between 350° C. and 450° C. In the present application example the blank is cooled for more than 10 minutes at a temperature of 400° C. such that its temperature in the inside is about 500° C.

In a subsequent processing step 124 the blank is heated using the heating devices 106A, 106B or 106C at a temperature between 1000° C. and 1250° C., wherein preferably it is considered that the blank is heated such that the surface temperature of the blank after the heating process is at least 100° C., particularly at least 150° C., above $T_G$, and is particularly in the range of 750° C. to 850° C.

A combination of cooling device 105A and heating device 106A, a combination of cooling device 105B and heating device 106B and a combination of cooling device 105C and heating device 106C, respectively, in the sense of the claims is an example for a tempering device for adjusting the temperature gradient.

Figure 7:
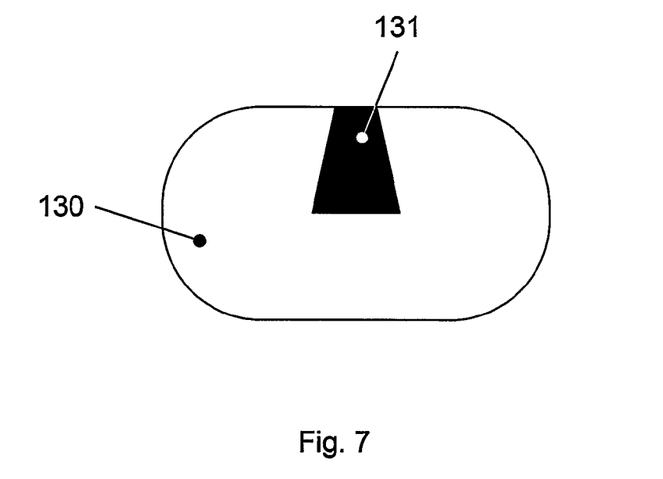
FIG. 7 shows an exemplary blank before entering a tempering device.
Figure 8:
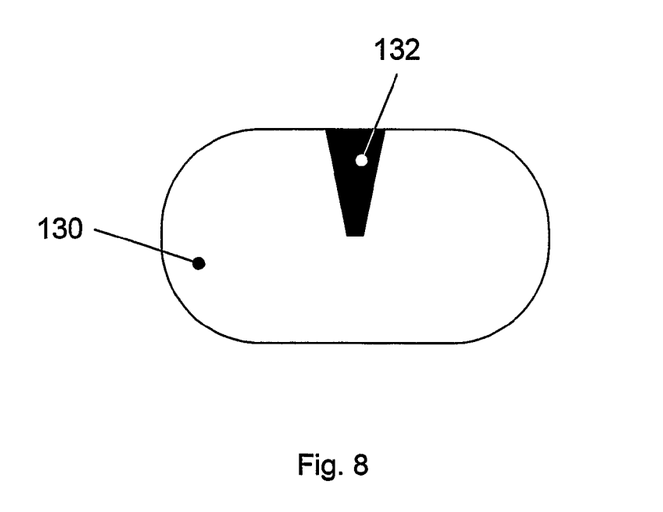
FIG. 8 shows an exemplary blank including an inverted temperature gradient after exiting the tempering device.

Processing steps 123 and 124 are—as explained in the following with respect to FIG. 7 and FIG. 8—coordinated such that an inversion of the temperature gradient is achieved. FIG. 7 shows an example of a blank 130 before entering one of the cooling devices 105A, 105B or 105C and FIG. 8 shows the blank 130 including an inverted temperature gradient after exiting one of the heating devices 106A, 106B or 106C. While the blank before processing step 123 (under the assumption of a continuous temperature curve) is inside warmer than outside after processing step 124 (under the assumption of a continuous temperature curve) it is outside warmer than inside. The wedges indicated by reference symbols 131 and 132 represent the temperature gradients, wherein the width of one of the wedges 131 and 132, respectively, represents a temperature.

For inverting the temperature gradient in a particular embodiment a blank is moved (particularly substantially continuously) lying on a cooled lance (not shown) through a tempering device including one of the cooling devices 105A, 105B or 105C and one of the heating devices 106A, 106B or 106C or held in one of the cooling devices 105A, 105B or 105C and/or one of the heating devices 106A, 106B or 106C. An appropriate cooled lance is disclosed in DE 101 00 515 A1. Preferably a coolant flows through the lance according to a reverse flow principle. Alternatively or additionally it can be contemplated to heat the coolant additionally or actively.

Downstream of the heating devices 106A, 106B, 106C a press 108 is provided to which a blank is transferred via a transfer station 107. The blank is blank molded, particularly on both sides, using press 108 in a processing step 125 into a headlight lens for a motor vehicle or a lens for a motor vehicle headlight. Subsequently the headlight lens for a motor vehicle or the lens for a motor vehicle headlight is transferred to a cooling zone 110 via a transfer station 109. The headlight lens for a motor vehicle or the lens for a motor vehicle headlight is cooled in a processing step 126 via the cooling zone 110. The device 10 shown in FIG. 5 further includes a control assembly 115 for controlling or adjusting the device 101 shown in FIG. 5. The control assembly 115 preferably provides for a continuous link between the individual processing steps.

The elements or components in FIG. 1, FIG. 5, FIG. 7, FIG. 8 and FIG. 9 are shown taking into consideration simplicity and clarification and are not necessarily to scale. For example the dimensions of some elements are shown exaggerated compared to other elements for improving the understanding of the application examples of the present invention.

What is claimed is:

1. A method of blank molding a headlight lens for a motor vehicle headlight, the method comprising:
    producing a blank from glass;
    inverting a temperature gradient of the blank by cooling at a temperature between 20K and 200K beneath the transformation temperature TG of the glass of the blank and subsequently heating the blank at a temperature between 1000° C. and 1250° C.; and
    subsequently blank molding the headlight lens from the blank for achieving a desired contour of the lens without post-treatment of the contour.

2. The method of claim 1, wherein the temperature of the blank before the heating is in the range of TG−80K to TG+30K.

3. The method of claim 2, wherein the blank is heated such that its surface temperature assumes a temperature corresponding to a temperature at which the glass of the blank has a viscosity between $10^{5.5}$ Pas and $10^7$ Pas.

4. The method of claim 3, wherein the mass of the blank is in the range of 50 g to 250 g.

5. The method of claim 1, wherein the blank is heated such that its surface temperature assumes a temperature corresponding to a temperature at which the glass of the blank has a viscosity between $10^{5.5}$ Pas and $10^7$ Pas.

6. The method of claim 5, wherein the temperature gradient of the blank is adjusted such that the temperature in the core of the blank is always at least 100° C. above room temperature.

7. The method of claim 1, wherein the temperature gradient of the blank is adjusted such that the temperature in the core of the blank is always at least 100° C. above room temperature.

8. The method of claim 1, wherein the blank is cooled at a temperature between 300° C. and 500° C.

9. A method of blank molding a headlight lens for a motor vehicle headlight, the method comprising:
    producing a blank from glass;
    inverting a temperature gradient of the blank by cooling and subsequently heating the blank at a temperature between 1000° C. and 1250° C., wherein the blank is cooled such that the temperature of the blank before the heating is in the range of TG−80K to TG+30K; and
    subsequently blank molding the headlight lens from the blank for achieving a desired contour of the lens without post-treatment of the contour.

10. The method of claim 9, wherein the blank is heated such that its surface temperature assumes a temperature corresponding to a temperature at which the glass of the blank has a viscosity between $10^{5.5}$ Pas and $10^7$ Pas.

11. The method of claim 10, wherein the mass of the blank is in the range of 50 g to 250 g.

12. The method of claim 11, wherein the temperature gradient of the blank is adjusted such that the temperature in the core of the blank is always at least 100° C. above room temperature.

13. The method of claim 10, wherein the blank is cooled at a temperature between 300° C. and 500° C.

14. The method of claim 9, wherein the temperature gradient of the blank is adjusted such that the temperature in the core of the blank is at least 100° C. above room temperature.

15. The method of claim 9, wherein the blank is cooled at a temperature between 300° C. and 500° C.

16. A method of blank molding a headlight lens for a motor vehicle headlight, the method comprising:

producing a blank from glass;

inverting a temperature gradient of the blank by cooling and subsequently heating the blank such that the viscosity at the surface of the blank is at least $10^5$ Pas lower than the viscosity of the core of the blank; and subsequently blank molding the headlight lens from the blank for achieving a desired contour of the lens without post-treatment of the contour.

17. The method of claim 16, wherein the mass of the blank is in the range of 50 g to 250 g.

18. The method of claim 16, wherein the temperature gradient of the blank is adjusted such that the temperature in the core of the blank is always at least 100° C. above room temperature.

19. The method of claim 16, wherein the blank is cooled at a temperature between 300° C. and 500° C.

20. The method of claim 16, wherein heating of the blank is performed at a temperature between 1000° C. and 1250° C.

21. The method of claim 16, wherein the blank is heated such that its surface temperature assumes a temperature corresponding to a temperature at which the glass of the blank has a viscosity between $10^{5.5}$ Pas and $10^7$ Pas.

22. A method of blank molding a headlight lens for a motor vehicle headlight, the method comprising:

producing a blank from glass;

inverting a temperature gradient of the blank by cooling and subsequently heating the blank at a temperature between 1000° C. and 1250° C. such that its surface temperature assumes a temperature corresponding to a temperature at which the glass of the blank has a viscosity between $10^{5.5}$ Pas and $10^7$ Pas; and subsequently blank molding the headlight lens from the blank for achieving a desired contour of the lens without post-treatment of the contour.

23. The method of claim 22, wherein the mass of the blank is in the range of 50 g to 250 g.

24. The method of claim 22, wherein the temperature gradient of the blank is adjusted such that the temperature in the core of the blank is always at least 100° C. above room temperature.

25. The method of claim 22, wherein the blank is cooled at a temperature between 300° C. and 500° C.

26. A method of blank molding a headlight lens for a motor vehicle headlight, the method comprising:

producing a blank from glass;

inverting a temperature gradient of the blank by cooling at a temperature between 70K and 150K beneath the transformation temperature TG of the glass of the blank and subsequently heating the blank such that its surface temperature assumes a temperature corresponding to a temperature at which the glass of the blank has a viscosity between $10^5$ Pas and $10^8$ Pas; and subsequently blank molding the headlight lens from the blank for achieving a desired contour of the lens without post-treatment of the contour.

27. The method of claim 26, wherein the temperature of the blank before the heating is in the range of TG−80K to TG+30K.

28. The method of claim 26, wherein the mass of the blank is in the range of 50 g to 250 g.

29. The method of claim 26, wherein the temperature gradient of the blank is adjusted such that the temperature in the core of the blank is always at least 100° C. above room temperature.

30. The method of claim 26, wherein heating of the blank is performed at a temperature between 1000° C. and 1250° C.

31. The method of claim 26, wherein the blank is cooled at a temperature between 300° C. and 500° C.

32. The method of claim 26, wherein the blank is heated such that its surface temperature assumes a temperature corresponding to a temperature at which the glass of the blank has a viscosity between $10^{5.5}$ Pas and $10^7$ Pas.

* * * * *